US008521436B2

(12) United States Patent
Agar et al.

(10) Patent No.: US 8,521,436 B2
(45) Date of Patent: Aug. 27, 2013

(54) MULTI-PHASE FLUID MEASUREMENT APPARATUS AND METHOD

(75) Inventors: Joram Agar, Grand Cayman (KY); Vikram Siddavaram, Houston, TX (US)

(73) Assignee: Agar Corporation Ltd., Grand Cayman (KY)

( * ) Notice: Subject to any disclaimer, the term of this patent is extended or adjusted under 35 U.S.C. 154(b) by 231 days.

(21) Appl. No.: 12/773,663

(22) Filed: May 4, 2010

(65) Prior Publication Data

US 2010/0280757 A1 Nov. 4, 2010

Related U.S. Application Data

(60) Provisional application No. 61/175,370, filed on May 4, 2009.

(51) Int. Cl.
*G01F 1/74* (2006.01)

(52) U.S. Cl.
USPC .......................... 702/12; 73/861.04

(58) Field of Classification Search
USPC .......................................................... 702/12
See application file for complete search history.

(56) References Cited

U.S. PATENT DOCUMENTS

| 5,099,697 | A | 3/1992 | Agar |
| 5,101,163 | A | 3/1992 | Agar |
| 5,101,367 | A | 3/1992 | Agar |
| 5,263,363 | A | 11/1993 | Agar |
| 5,461,930 | A * | 10/1995 | Farchi et al. ............... 73/861.04 |
| 5,524,475 | A * | 6/1996 | Kolpak et al. ............... 73/19.03 |
| 5,551,305 | A | 9/1996 | Farchi et al. |
| 5,589,642 | A | 12/1996 | Agar et al. |
| 5,591,922 | A * | 1/1997 | Segeral et al. ............. 73/861.04 |
| 6,335,959 | B1 * | 1/2002 | Lynch et al. ................... 378/45 |
| 6,487,916 | B1 * | 12/2002 | Gomm et al. ............. 73/861.29 |
| 6,993,979 | B2 | 2/2006 | Segeral |
| 7,293,471 | B2 | 11/2007 | Lund Bo et al. |
| 7,726,203 | B2 | 6/2010 | Mattar et al. |
| 2003/0154036 | A1 * | 8/2003 | Gysling et al. ................... 702/25 |
| 2004/0194539 | A1 * | 10/2004 | Gysling ....................... 73/61.45 |
| 2005/0229716 | A1 | 10/2005 | Unsworth et al. |
| 2007/0095136 | A1 * | 5/2007 | Hewitt et al. .................... 73/200 |
| 2007/0193373 | A1 * | 8/2007 | Xie et al. .................... 73/863.03 |
| 2008/0223146 | A1 * | 9/2008 | Atkinson et al. ........... 73/861.04 |
| 2008/0243400 | A1 | 10/2008 | Bell et al. |

OTHER PUBLICATIONS

Draper et al., "Applied Regression Analysis", 1981,2nd Edition, pp. 218-220.*

* cited by examiner

*Primary Examiner* — Sujoy Kundu
*Assistant Examiner* — Regis Betsch
(74) *Attorney, Agent, or Firm* — Andrew W. Chu; Craft Chu PLLC

(57) ABSTRACT

The present disclosure provides a flowmeter including a vibrating element configured to be inserted in a measured fluid; a driver circuit to vibrate the vibrating element in its natural frequency of oscillation; one or more additional technology flow meters configured to measure an additional property of the fluid; a data acquisition circuit configured to measure signals effected by the flow of a multi-phase fluid; and a computer suitable to solve non-linear simultaneous equations. The fluid may include gas, oil and/or water. The fluid may also include solids.

18 Claims, 7 Drawing Sheets

MULTI-PHASE FLUID MEASUREMENT APPARATUS AND METHOD

CROSS REFERENCE TO RELATED APPLICATIONS

The present application claims priority from U.S. Provisional Application Ser. No. 61/175, 370, filed May 4, 2009.

BACKGROUND

1. Field of the Disclosure

This disclosure relates generally to multiphase flow measurements of wellbore fluids.

2. Description of the Related Art

Wellbore fluids often are multi-phase fluids that contain oil, gas and water. The composition, flow rate, and viscosity of each component (oil, water, and gas) vary from well to well. Usually, the flow rate of the gas is the fastest and that of the oil the slowest, unless the fluid is well-mixed and gas is entrained inside the liquid. The large variety of flow patterns in which the liquid and gas might be distributed and the variations in the physical properties of each component makes flow rate prediction of each component difficult.

At low fluid velocities, wellbore liquids tend to accumulate at low pockets in horizontal pipes while gas coalesces into large and small bubbles, which propagate faster than the liquid in vertical tubings or risers. Both of these aspects cause the gas to flow faster than the liquid, or in other words, increase the slip between the gas and liquid. Fluid density is a parameter used for determining the flow of multiphase fluids. Some methods utilize spot density, which is the density at a particular cross-section of the flow conduit, over a very narrow (compared to the hydraulic diameter) length of the conduit. Spot density may be different from the homogeneous mixture density due to the slip between the gas and liquid in the multiphase fluid. A common method to measure the spot density of a fluid utilizes a radioactive source and measures the absorption of the gamma rays by the fluid media. This method is more sensitive to minerals than to the hydrocarbons and the density is typically measured across a small section of the pipe carrying the fluid. Because of this, spot density measurement, information regarding slip and thus the corrected bulk-density is lost. Bulk density, which is the density of the fluid mixture in a reasonably long flow conduit (compared to the hydraulic diameter), is more representative of the average density. Bulk density requires less slip correction but is still dependent on slip.

Mathematical models have been used for computing multi-phase fluid flow. Such methods, however, require rigorous knowledge of the boundary conditions of multiple parameters, such as surface tension, viscosity, fluid mixture, etc. As such parameters are not be measured in line (in-situ), the value of slip is assumed or obtained from certain empirical experiments. This confines the validity of the mathematical model to the specific assumptions made or the results of the experiments made. The slip value in the multiphase fluid produced from a wellbore is sometimes different from such experimentally determined slip values, and thus large errors can result. We illustrate the above statement by way of an example. FIGS. 1$a$ and 1$b$ illustrate two typical flow regimes in horizontal and vertical pipe flows respectively. If the inclination of the horizontal pipe is changed slightly to +15° upward or −15° downward, the flow pattern will be completely different from what is shown. Similarly, the flow pattern for an inclination of 5° will be different from that for an inclination of 15°, 11°, etc. and therefore the resulting slip values will be completely different. Since there is a huge variety of piping configurations and fluid parameter values, using empirically determined slip values will lead to large errors.

The flow of a multiphase wellbore fluid may be expressed as a set of non-linear partial differential equations, as given below:

Conservation of Mass:

$$\frac{\partial}{\partial t}(\rho_N \alpha_N) + \frac{\partial (\rho_N j_{Ni})}{\partial x_i} = I_N \qquad \text{Eqn. 1}$$

Conservation of Momentum:

$$\frac{\partial}{\partial t}(\rho_N \alpha_N u_{Nk}) + \frac{\partial}{\partial x_i}(\rho_N \alpha_N u_{Ni} u_{Nk}) = \qquad \text{Eqn. 2}$$

$$\alpha_N \rho_N g_k + F_{Nk} - \delta_N \left\{ \frac{\partial p}{\partial x_k} - \frac{\partial \sigma_{Cki}^D}{\partial x_i} \right\}$$

Conservation of Energy $$\frac{\partial}{\partial t}(\rho_N \alpha_N e_N^*) + \frac{\partial}{\partial x_i}(\rho_N \alpha_N e_N^* u_{Ni}) = \qquad \text{Eqn. 3}$$

$$Q_N + W_N + E_N + \delta_N \frac{\partial}{\partial x_k}(u_{Ci} \sigma_{Cij})$$

In the above equations, the subscript N denotes a specific phase or component, which in the case of wellbore fluid may be oil (O), water (W) and gas (G). The lower case subscripts (i, ik, etc.) refer to vector or tensor components. We follow the tensor notation where a repeated lower case subscript implies summation over all of its possible values, e.g.

$$u_i u_i = u_1 u_1 + u_2 u_2 + u_3 u_3 \qquad \text{Eqn. 4}$$

$\rho_N$ is the density of component N, $\alpha_N$ is the volume fraction of component N, and $j_{Ni}$ is the volumetric flux (volume flow per unit area) of component N, where i is 1, 2, or 3 respectively for one-dimensional, two-dimensional or three-dimensional flow. $I_N$ results from the interaction of different components in the multiphase flow. $I_N$ is the rate of transfer of mass to the phase N, from the other phases per unit volume. $u_{Nk}$ is the velocity of component N along direction k. The volumetric flux of a component N and its velocity are related by:

$$j_{Nk} = \alpha_N u_{Nk} \qquad \text{Eqn. 5}$$

$g_k$ is the direction of gravity along direction k, p is the pressure, $\sigma_{Cki}^D$ is the deviatoric component of the stress tensor $\sigma_{Cki}$ acting on the continuous phase, $F_{Nk}$ is the force per unit volume imposed on component N by other components within the control volume.

$e_N^*$ is the total internal energy per unit mass of the component N.

Therefore, $$e_N^* = e_N + \frac{1}{2} u_{Ni} u_{Ni} + gz \qquad \text{Eqn. 6}$$

where $e_N$ is the internal energy of component N. $Q_N$ is the rate of heat addition to component N from outside the control volume, $W_N$ is the rate of work done to N by the exterior surroundings, and $E_N$ is the energy interaction term, i.e. the sum of the rates of heat transfer and work done to N by other components within the control volume.

The above equations are subject to the following constraints:

$$\sum_N I_N = 0 \qquad \text{Eqn. 7}$$

$$\sum_N F_{Nk} = 0 \qquad \text{Eqn. 8}$$

$$\sum_N E_N = 0 \qquad \text{Eqn. 9}$$

The above equations are a system of nonlinear partial differential equations, the solution to which, when it exists for a set of narrow initial and boundary conditions, results in a series which does not always converge. Also, since the initial conditions and boundary conditions, such as the initial bubble size and the distribution of bubbles in the conduit are neither measured nor known a priori for the different flow regimes, those conditions are thus often estimated from prior historical knowledge. Since the above methods make certain assumptions, they may lead to inaccurate results.

The disclosure herein provides an improved apparatus and method for multiphase fluid measurements.

SUMMARY

The present disclosure provides a flowmeter including a vibrating element configured to be inserted in a measured fluid; a driver circuit to vibrate the vibrating element in its natural frequency of oscillation; one or more additional technology flow meters configured to measure an additional property of the fluid; a data acquisition circuit configured to measure signals effected by the flow of a multi-phase fluid; and a computer suitable to solve non-linear simultaneous equations. In one aspect, multi-phase fluid is gas and the second phase is a liquid. In another aspect, the multi-phase fluid includes a first phase that is gaseous, and a second phase of oil and a third phase including water. In another aspect, the multi-phase fluid includes phases of gas, oil, water and a solid. The data acquisition circuit may be configured to collect data from various process-related sensors and to input the collected data to the computer. The computer may be configured to solve non-linear simultaneous equations using the multiple signals. In one aspect, the computer is configured to output a slip-corrected total mass flow rate based on the inputs from the data acquisition circuit. In yet another aspect, the computer is further configured to output a viscosity-corrected total mass flow rate based on the inputs from the data acquisition circuit. The computer may output a corrected mass flow rate of i) gas and liquid, ii) gas, oil and water, and iii) gas, oil, water and solids. The measured signals are signals related to power, frequency, pressure, temperature.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements have generally been designated with like numerals and wherein.

DETAILED DESCRIPTION OF THE DISCLOSURE

In one aspect, the system described herein measures the bulk density and flow of a multi-phase flow stream in real-time and utilizes simultaneous equations to correct for the slip, which slip is common in both the density and fluid flow measurements. In another aspect, the system may utilize another independent flow meter to increase the number of equations to allow for the use of a wider band of flow conditions. In another aspect, additional measurements of power, viscosity etc. may be made to increase the number of simultaneous equations, and hence the accuracy of the multi-phase flow calculations.

Figure 1A:
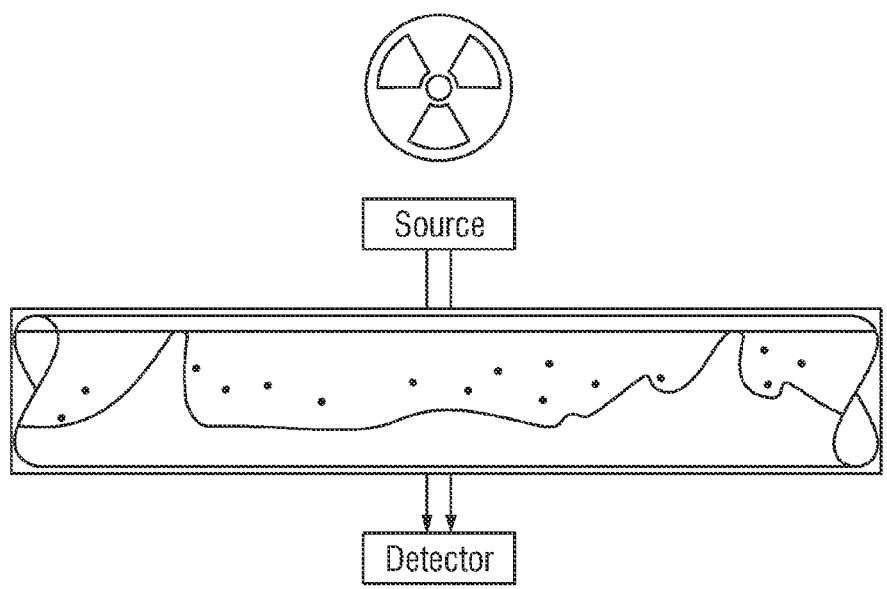
FIG. 1a illustrates wavy-annular flow in a horizontal pipe.
Figure 1B:
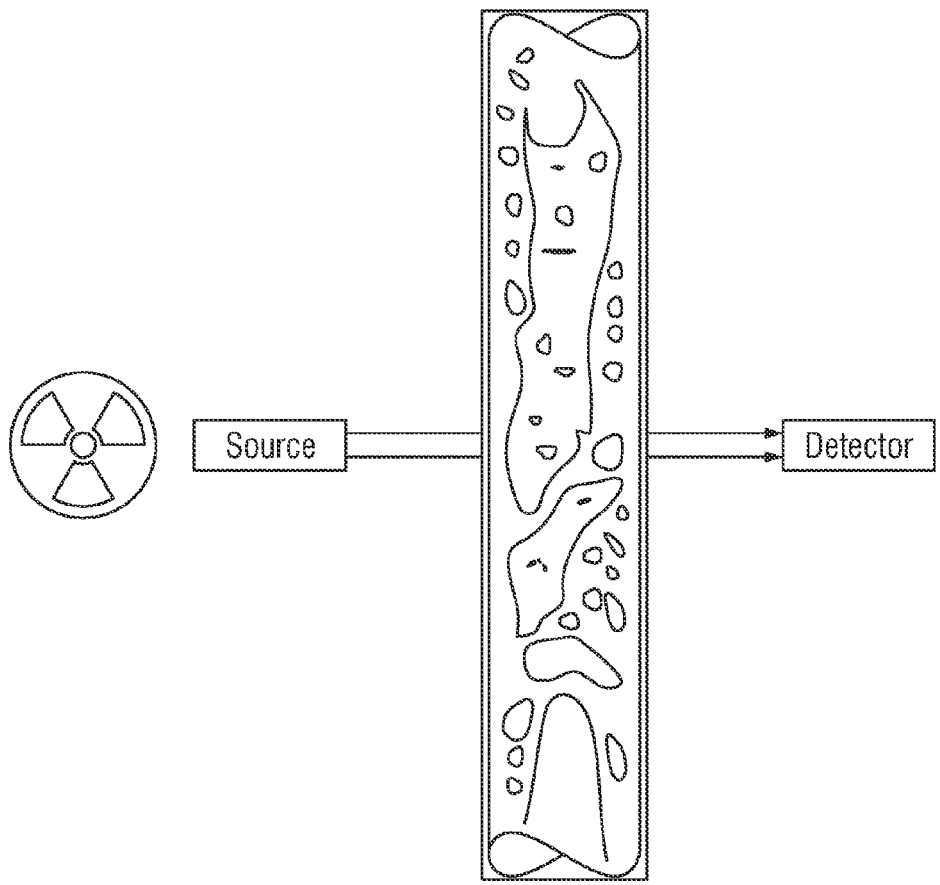
FIG. 1b illustrates churn flow in a vertical pipe.
Figure 1C:
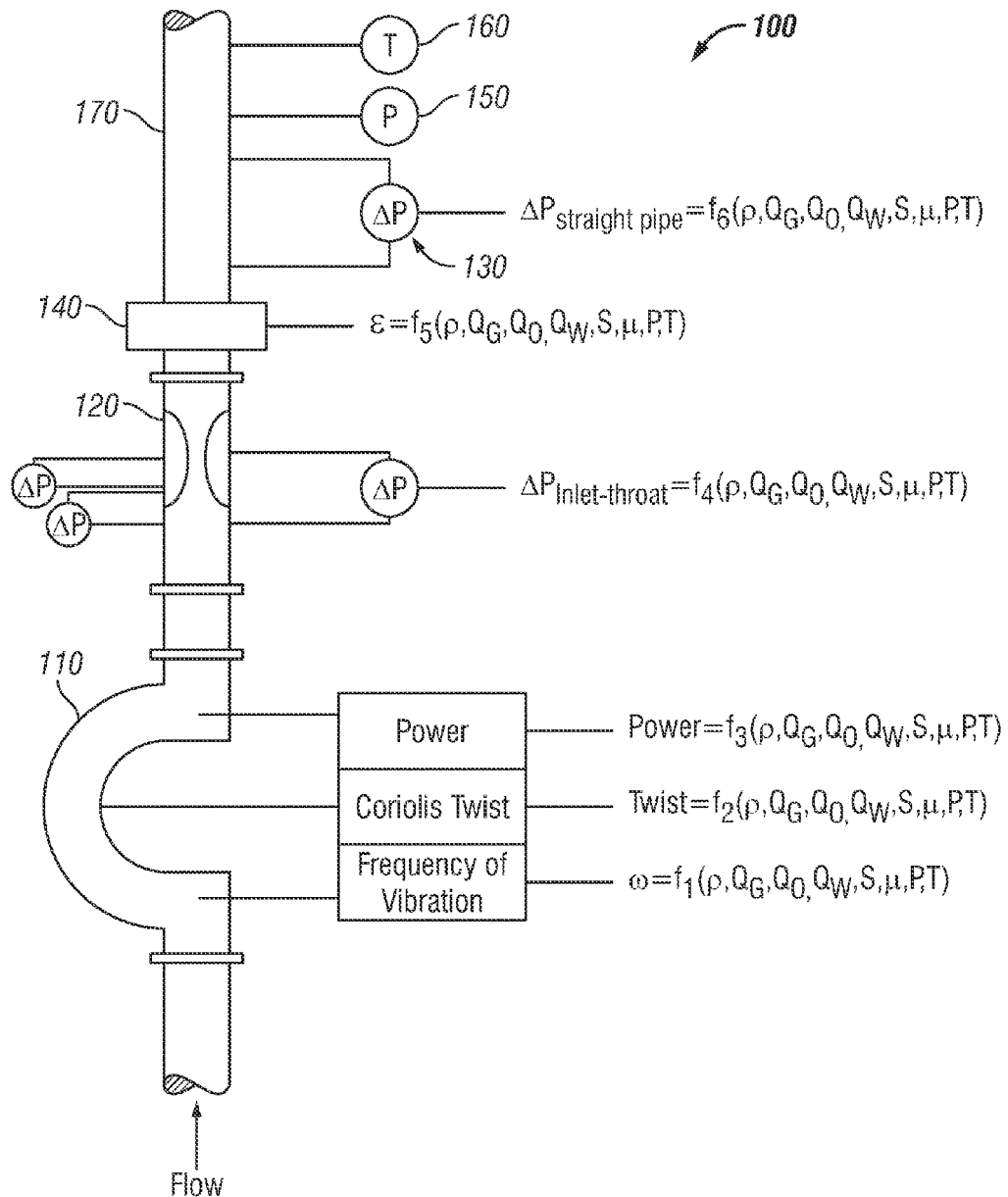
FIG. 1c is a schematic diagram of a multi-phase flow meter apparatus according to one embodiment of the disclosure.

FIG. 1c is a schematic diagram of a multi-phase flow measuring system 100 according to one embodiment of the disclosure. The system 100 is shown to include a Coriolis meter 110 to measure in-situ the density of the fluid 102 flowing through the meter 110 by measuring the natural frequency of oscillation of the tubes inside the meter 110. In one aspect, the power and frequency of the Coriolis driving circuit is measured to obtain two equations. In another aspect, the system 100 measures the Coriolis twist of the tubes 112, which twist is proportional to the mass flow rate through the tubes.

The equations describing the motion of the tubes 112 and the Coriolis twist that may be utilized are given below. Both the Coriolis twist and natural frequency are affected by the slip. The additional unknown are the liquid and gas flow rates.

$$\omega = f_1(\rho, Q_G, Q_O, Q_W, S, \mu, P, T) \qquad \text{Eqn. 10}$$

$$\text{Twist} = f_2(\rho, Q_G, Q_O, Q_W, S, \mu, P, T) \qquad \text{Eqn. 11}$$

$$\text{Power} = f_3(\rho, Q_G, Q_O, Q_W, S, \mu, P, T) \qquad \text{Eqn. 12}$$

In the above equations, $\rho$ is the density of the mixture, $Q_G$ is the volumetric flow rate of the gas, $Q_O$ is the volumetric flow rate of the oil, $Q_W$ is the volumetric flow rate of the water, S is the slip ratio, and $\mu$ is the flow averaged viscosity of the liquid, P is the line pressure, and T is the line temperature.

Solving for six (6) unknowns with three (3) equations is not feasible. Therefore, three (3) additional equations are required. To arrive at another equation for this additional unknown, the system 100 utilizes another meter, such as a venturi meter 120 shown in FIG. 1c. The pressure drop from the inlet of the venturi to the throat also depends on the slip, as given in the fourth equation below.

$$\Delta P_{inlet-throat} = f_4(\rho, Q_G, Q_O, Q_W, S, \mu, P, T) \qquad \text{Eqn. 13}$$

Slip may be obtained from a ratio of first and second differential pressures wherein the first differential pressure is measured from an input of the venturi meter to a mid-cone position and the second differential pressure is measured from the mid-cone position to a throat of the venturi meter.

The fifth equation may be obtained from a water-cut meter 140, which may be connected in tandem with the Coriolis and the venturi meter to measure the water cut and thus compute the oil, water and gas flow rates. Any suitable water cut meter may be used, including one sold by Agar Corporation. The Agar water-cut meter measures the complex dielectric of the fluid and uses the Bruggeman's equation to determine the concentrations of oil and water in the liquid.

$$\varepsilon = f_5(\rho, Q_G, Q_O, Q_W, S, \mu, P, T) \qquad \text{Eqn. 14}$$

As noted earlier, variation in viscosity ($\mu$) influences slip (S), among other variables, and can contribute significantly to the errors in flow measurement. Therefore, it is desirable to have a sixth equation if the viscosity is changing significantly. Employing another equation means one extra measurement needs to be made. In one aspect, the system may measure viscosity by measuring the pressure-drop across a short straight section of the piping 130, and uses this measurement to compensate for the errors introduced due to varying viscosity.

$$\Delta P_{straight\ pipe} = f_6(\rho, Q_G, Q_O, Q_W, S, \mu, P, T) \qquad \text{Eqn. 15}$$

The line pressure P and temperature T measurements to convert the flow rates measured at line conditions to those at standard conditions may be obtained from a pressure sensor 150 and a temperature sensor 160 in the flow line 170. The above system of nonlinear simultaneous equations may be written in the form a matrix-like expression, as shown below.

$$\begin{Bmatrix} \omega \\ \text{Twist} \\ \text{Power} \\ \Delta P_{inlet-throat} \\ \varepsilon \\ \Delta P_{straight\ pipe} \end{Bmatrix} = \begin{bmatrix} A_{11} & A_{12} & A_{13} & A_{14} & A_{15} & A_{16} \\ A_{21} & A_{22} & A_{23} & A_{24} & A_{25} & A_{26} \\ A_{31} & A_{32} & A_{33} & A_{34} & A_{35} & A_{36} \\ A_{41} & A_{42} & A_{43} & A_{44} & A_{45} & A_{46} \\ A_{51} & A_{52} & A_{53} & A_{54} & A_{55} & A_{56} \\ A_{61} & A_{62} & A_{63} & A_{64} & A_{65} & A_{66} \end{bmatrix} \cdot \begin{Bmatrix} \rho \\ Q_G \\ Q_O \\ Q_W \\ S \\ \mu \end{Bmatrix} \qquad \text{Eqn. 16}$$

As the equations are non-linear, the elements (Ax) of the expression are not constant. For example, in the case of a single-phase flow of only water, i.e. no oil and no gas, the equation for $\Delta P_{inlet\_throat}$ is:

$$\Delta P_{inlet-throat} = \frac{1}{2} \frac{\rho_W Q_W^2}{A_{inlet}^2 C_d^2} \left( \frac{1}{\beta^4} - 1 \right) \qquad \text{Eqn. 17}$$

In the above equation, $\rho_W$, is the density of water, $Q_W$, is the volumetric flow rate of water, $A_{inlet}$ is the area of inlet of the venturi meter, $\beta$ is the ratio of the throat diameter to the inlet diameter of the venturi, and $C_d$ is the coefficient of discharge.

Therefore, element $A_{44}$ is $$A_{44} = \frac{1}{2} \frac{\rho_W Q_W}{A_{inlet}^2 C_d^2} \left( \frac{1}{\beta^4} - 1 \right) \qquad \text{Eqn. 18}$$

Thus, it can be seen that $A_{44}$ depends on the variable $Q_W$ which is one of the unknowns. The system then may utilize an iterative method to solve such a system of equations.

Figure 2:
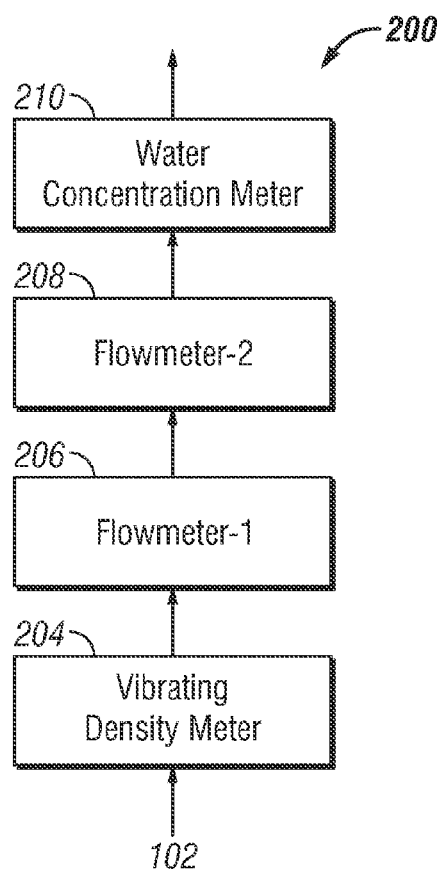
FIG. 2 is flow diagram of a method of determining multi-phase flow.

FIG. 1c describes a system version of an embodiment that identifies the individual components and subsections. As the number of unknowns in the flow, e.g., slip, viscosity, etc. increases so also the number of independent equations increases, and hence the number of independent measurements increases. By adjusting and arranging a number of instruments, accurate equations (mathematical models as opposed to empirical models) may be built according to one aspect of the disclosure. More accurate results may be obtained by adjusting the gain and zero of the measuring devices to yield the same common result, as described above. A simplified relationship that may be used to describe the apparatus and methods described herein may be expressed as:

Flow Apparatus→Vibrating Density Meter+Flow Meter$_1$+Flow Meter$_2$+Water Concentration Meter FIG. 2 is a flow diagram illustrating the above shown scheme for determining the flow rate of a multi-phase fluid, i.e., a vibrating density meter 204, a first flow meter 206, a second flow meter 208 and a water concentration meter 210.

The example given in reference to FIG. 1c corresponds to an embodiment that utilizes frequency from the Coriolis meter as a density measurement, Coriolis twist for the first flow measurement, and pressure drop from the inlet to throat of the venturi for the second flow measurement.

Figure 3:
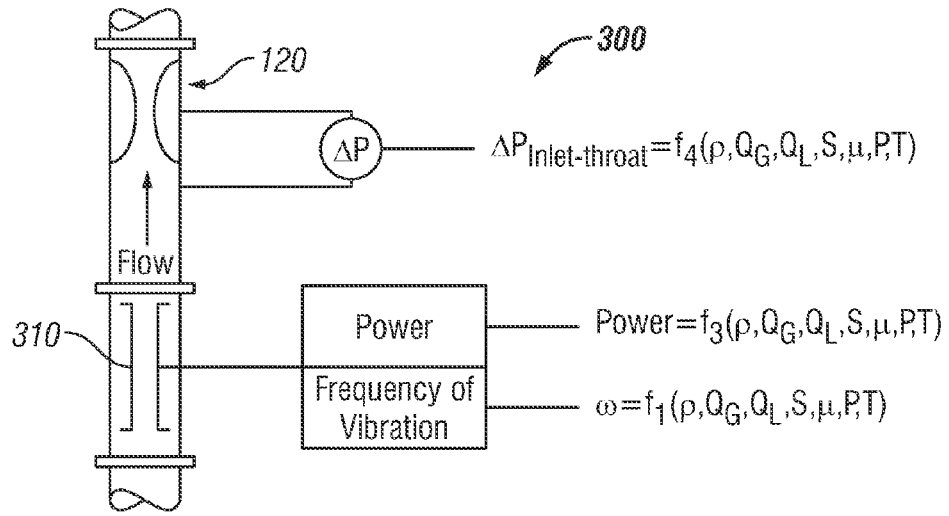
FIG. 3 is a schematic diagram of an apparatus for determining density by a density meter, such as vibrating fork, tubes and cylinders, floats and the like, for use in the method of determining flow of a multi-phase fluid.

FIG. 3 is a schematic diagram of an apparatus 300 for determining density by a density meter, such as a vibrating fork, tubes and cylinders, floats and the like. The density meter 310 may be coupled to the venturi meter 120 in the system for determining the flow of a multi-phase fluid flow.

Figure 4:
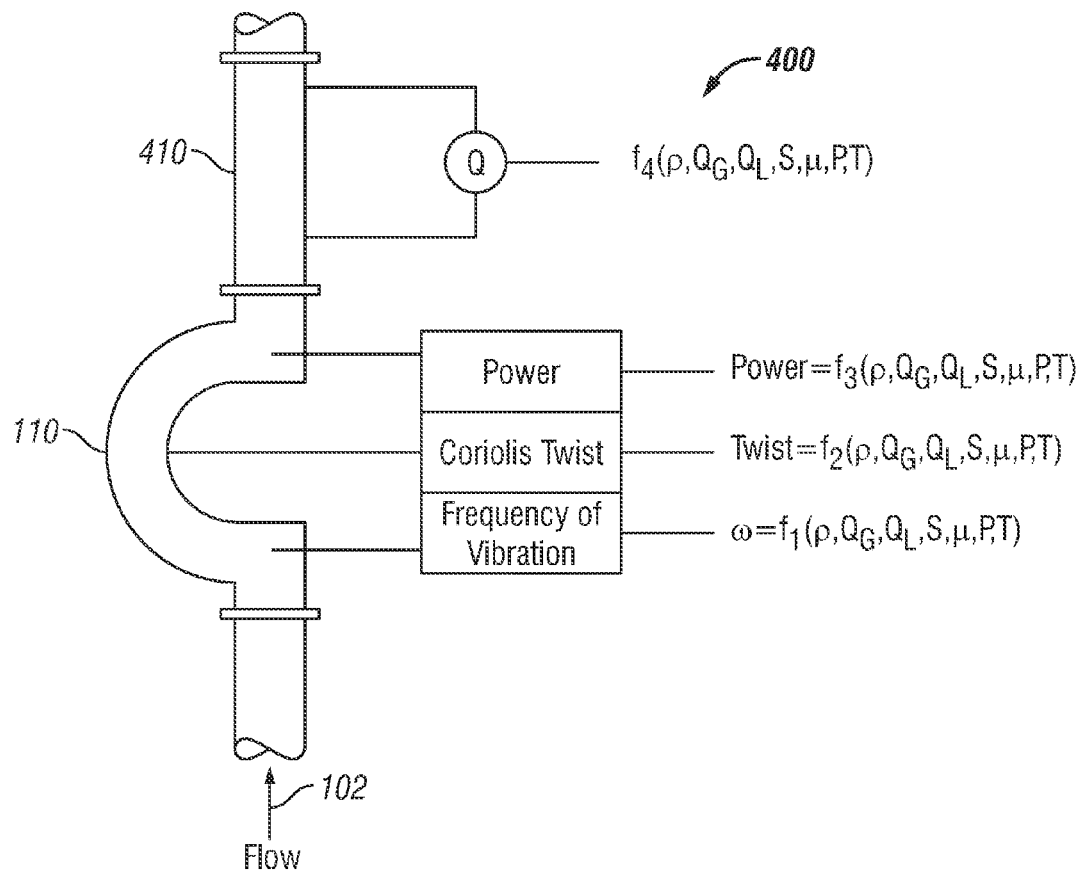
FIG. 4 is a schematic diagram showing an alternative flow meter, such as orifice plates, inverted cones, turbine flow meters, ultrasonic flow meters, positive displacement meters, and the like instead of the venturi meter shown in FIG. 1.

FIG. 4 is a schematic diagram of an apparatus 400 showing an alternative flow meter 410, such as an orifice plates, inverted cones, turbine flow meter, ultrasonic flow meter, positive displacement meter, and the like instead of the venturi meter 120 shown in FIG. 1.

Figure 5:
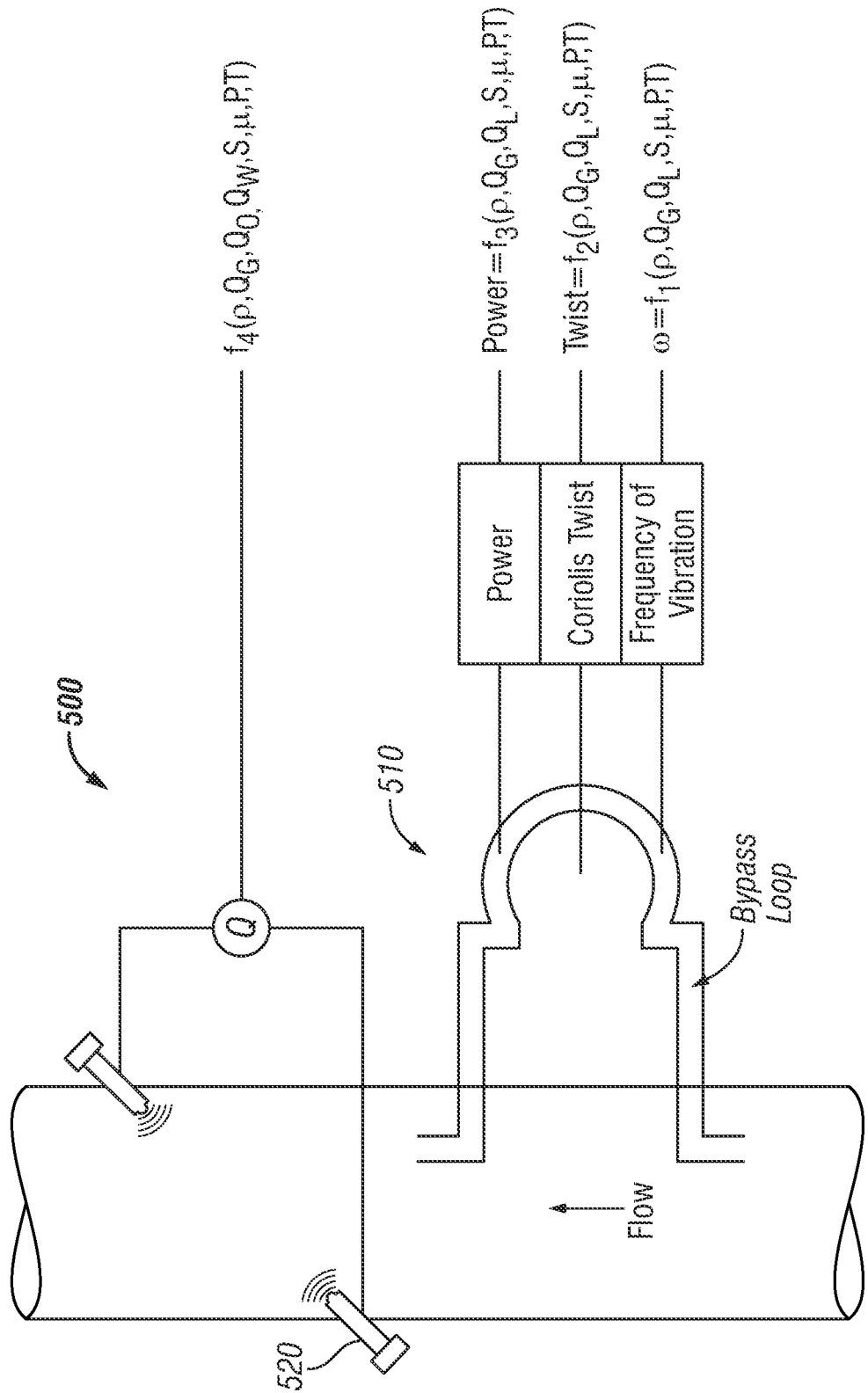
FIG. 5 is a schematic diagram of an alternative embodiment of an apparatus for measuring the flow rate, e.g. in wet-gas measurement.

In some cases, use of a large density meter in tandem with a flow meter may not be practical. FIG. 5 is a schematic diagram of an alternative embodiment of an apparatus 500 for measuring the flow rate. FIG. 5 shows a Coriolis Meter connected in a slip stream and is used to measure a portion of the mass flow, yet has the same fluid composition as the fluid in the main line. The fraction of the fluid in the bypass is predetermined, but is not critical as it exhibits only a small portion of the total flow which is measured by the flow meter 510.

Figure 6:
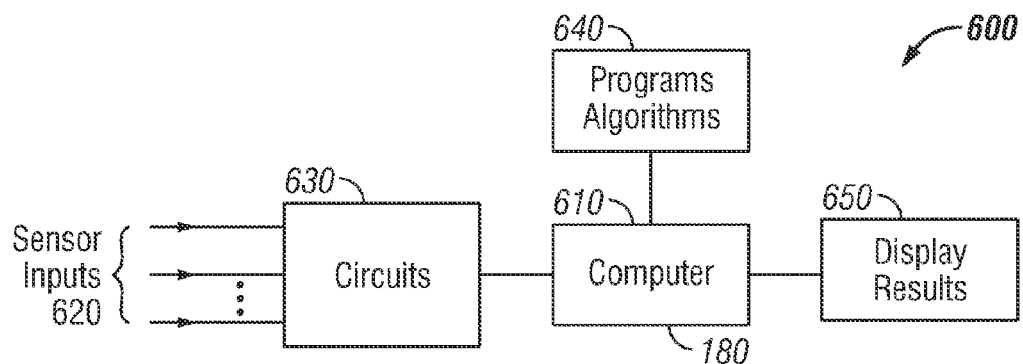
FIG. 6 is a functional diagram of an exemplary computer system configured for use with the system of FIG. 1.

FIG. 6 shows a computer system 600 that includes a computer or processor 610. Outputs 620 from the various sensors in the system of FIG. 1c (and the alternative embodiment shown in FIGS. 2-5) are fed to a data acquisition circuit 630 in the system of FIG. 6, which circuit is configured to output sensor information to the computer 610. The computer processes such information using the programs and algorithms and other information 640 stored in its memory, collectively denoted by 640, and provides on line (in-situ) the calculated results relating to the various parameters described herein and the fluid flow results of the multi-phase fluid 102. The equations described herein and the data used by the computer 610 may be stored in a memory in the computer or another storage device accessible to the computer. The results may be displayed on a display 650 device (such as a monitor) and/or provided in another medium of expression, such as hard copies, tapes, etc.

Thus, in one aspect, an apparatus for measuring flow of a multi-phase fluid is described that in embodiment may include a vibrating element inserted in the measured fluid, in conjunction with one or two different types of flow meters and a computer suitable to solve non-linear simultaneous equations, a driver circuit to vibrate the vibrating element in its natural frequency of oscillation, a data collection circuit for measuring, power, frequency, pressure, temperature and other process related signals, effected by the flow of multi-phase fluid. The fluid may include gas, oil and/or water. The fluid may also include solids.

Figure 7A:
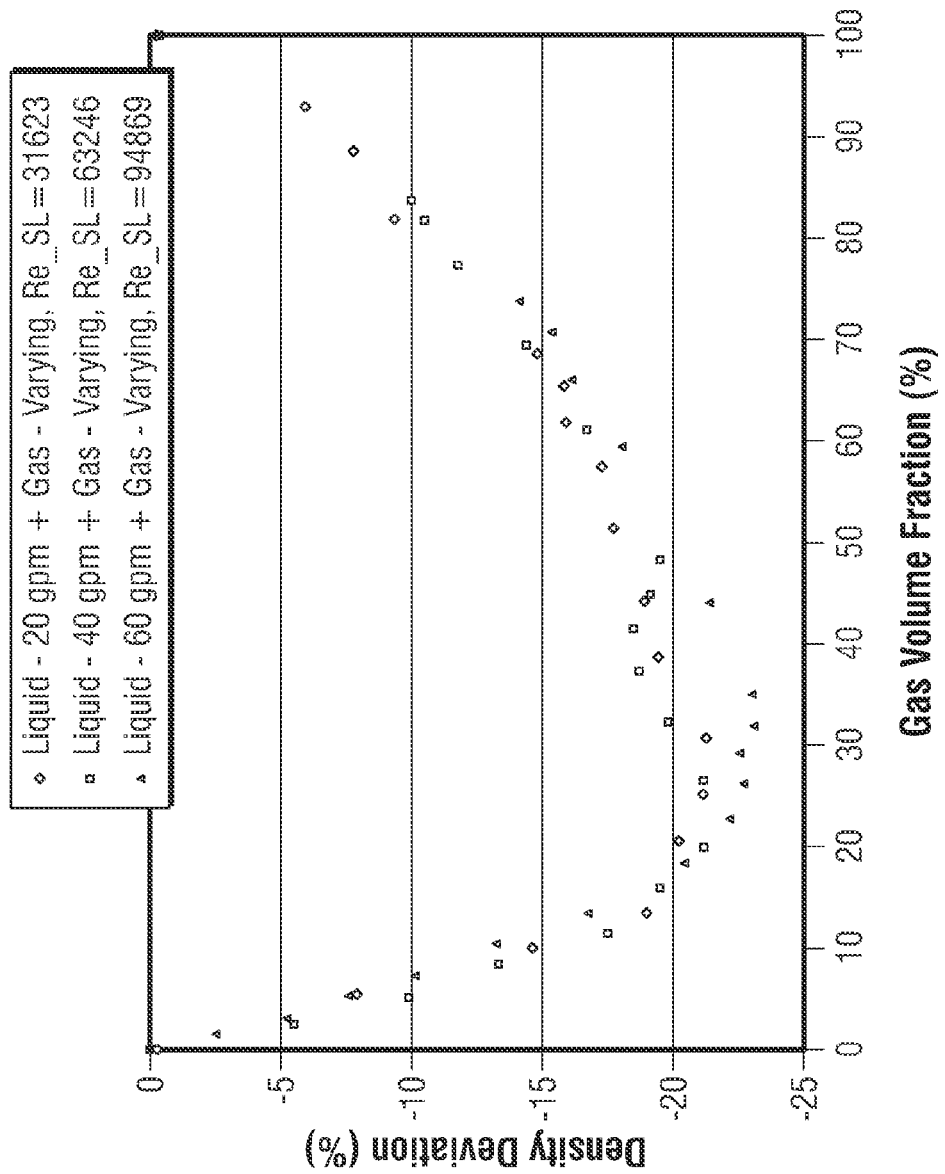
FIG. 7a shows a plot of density deviation versus gas volume fraction, as described in equation 19.

The results obtained using the above described methods are described in reference to FIG. 7a. The density deviation, defined below, as the amount of gas, or Gas Volume Fraction, GVF, is increased.

$$DensityDeviation = \frac{MeasuredBulkDensity - BulkDensityAssumingNoSlip}{LiquidDensity} \quad \text{Eqn. 19}$$

$$GasVolumeFraction = \frac{VolumeofGas}{VolumeofGas + VolumeofLiquid} \quad \text{Eqn. 20}$$

Figure 7B:
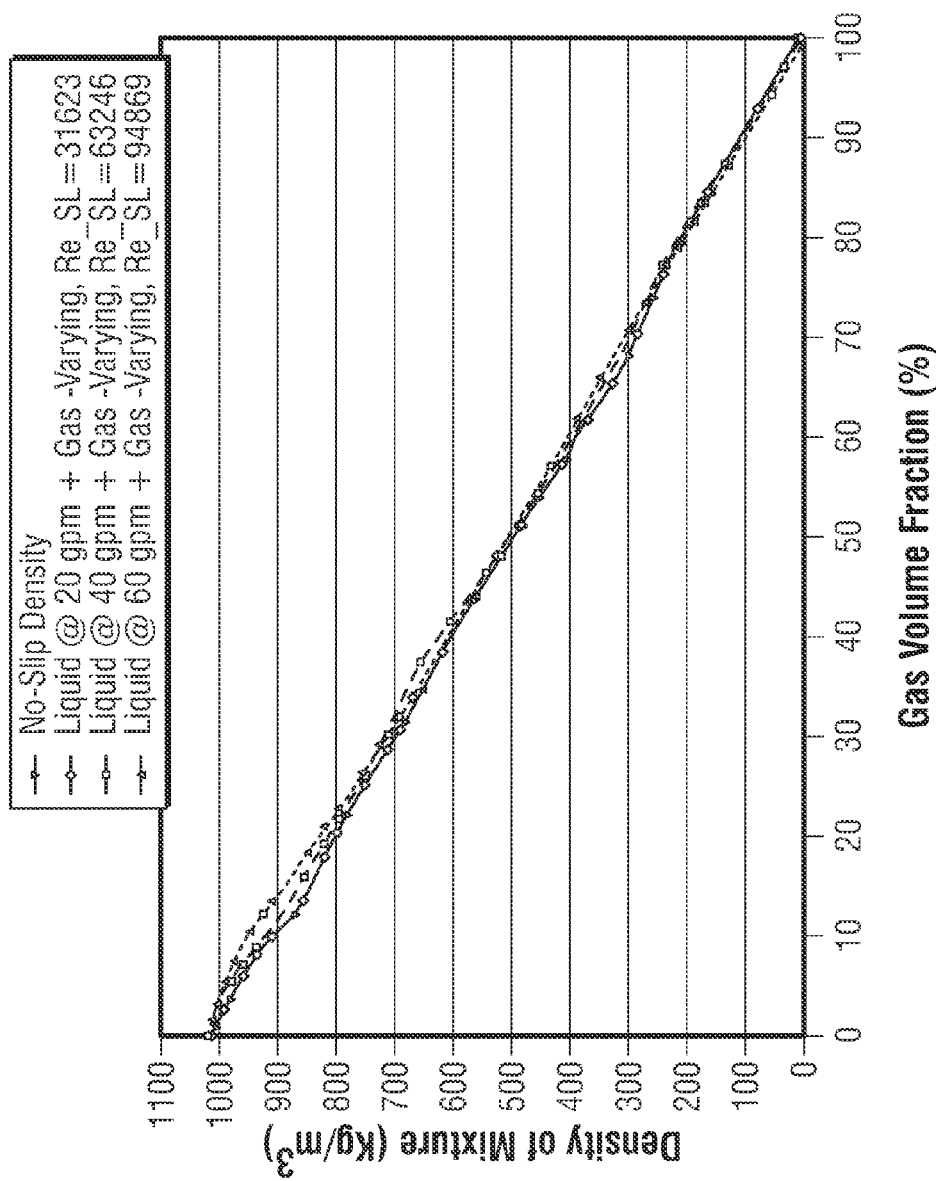
FIG. 7b shows a plot of the bulk density of the mixture, after correcting for the effect of slip, using equations 10 and 12, which shows that the gas volume fraction range of operation is from zero to one hundred percent.

FIG. 7b show the mixture bulk density, after correcting for the effect of slip, using equations 10 and 12. Further improvements in density correction may be made by using all of the equations 10-15. It can be seen that, the current method measures bulk density quite accurately in the full gas volume fraction range, i.e. $0 \leq GVF \leq 100\%$. Prior art methods typically measure the density accurately in the general range from $0 \leq GVF \leq 55\%$.

A data acquisition circuit may collect data from various sensors as inputs, such as frequency of oscillation, angle of twist, drive power consumption, pressure, temperature, differential pressure, complex dielectric, sound ways, torque, etc. A computer may be configured to solve non-linear simultaneous equations using the values of parameters calculated from the various sensors. In one aspect, the computer may be configured to output the slip-corrected total mass flow rate based on the inputs from the data acquisition circuit. In another aspect, the computer may be configured to output the slip and viscosity-corrected total mass flow rate based on the inputs from the data acquisition circuit. The computer may be configured to output the corrected mass or volume flow of the flowing gas and liquid. In yet another aspect, the computer may be configured to output the corrected mass or volume flow of the flowing gas, oil and water. The computer is operable to output the corrected mass or volume flow of the flowing gas, oil, water and solids. In another aspect, the pressure drop across a straight pipe or the pressure drop from flange to flange of a venturi tube may be utilized to compute viscous losses.

While the foregoing disclosure is directed to certain embodiments, various changes and modifications to such embodiments will be apparent to those skilled in the art. It is intended that all changes and modifications that are within the scope and spirit of the appended claims be embraced by the disclosure herein.

What is claimed is:

1. A flow meter system comprising:
    a first flow meter having an oscillating element inserted in a multi-phase fluid, said first flow meter taking a first measurement based on a set of parameters of said multi-phase fluid, said first measurement corresponding to a first group of interrelated unknown variables, said first flow meter taking a second measurement based on said set of parameters, said second measurement corresponding to a second group of interrelated unknown variables, said first flow meter taking a third measurement based on said set of parameters, said third measurement corresponding to a third group of interrelated unknown variables,
    wherein said interrelated unknown variables are selected from said set of parameters, and
    wherein the first, second, and third groups of interrelated unknown variables are different from each other;
    a second flow meter positioned downstream from said first flow meter, said second flow meter taking a fourth measurement based on said set of parameters, said fourth measurement corresponding to a fourth group of interrelated unknown variables, said fourth group of interrelated unknown variables being different from other groups of interrelated unknown variables;
    a third flow meter positioned downstream from said first flow meter and said second flow meter, said third flow meter taking a fifth measurement based on said set of parameters, said fifth measurement corresponding to a fifth group of interrelated unknown variables, said fifth group of interrelated unknown variables being different from other groups of interrelated unknown variables;
    a fourth flow meter positioned downstream from said first flow meter, said second flow meter, and said third flow meter, said fourth meter taking a sixth measurement based on said set of parameters, said sixth measurement corresponding to a sixth group of interrelated unknown variables, said sixth group of interrelated unknown variables being different from other groups of interrelated unknown variables; and
    a processor to solve equations of a mathematical model so as to estimate an amount of a target unknown variable selected from said set of parameters, wherein the first, second, third, fourth, fifth, and sixth measurements of the first, second, and third flow meters determine said equations of said mathematical model, wherein said equations each correspond to the first, second, third, fourth, fifth, and sixth groups of interrelated unknown variables, and wherein an iterative process is used to solve said equations.

2. The flow meter system according to claim 1, further comprising:
    a pressure detector, positioned downstream from the first, second, and third flow meters.

3. The flow meter system according to claim 1, further comprising:
    a temperature detector, positioned downstream from the first, second, and third flow meters.

4. The flow meter system according to claim 1, wherein said first flow meter is comprised of a Coriolis meter, said first measurement being frequency of vibration.

5. The flow meter system according to claim 4, said second measurement being Coriolis twist.

6. The flow meter system according to claim 5, said third measurement being power.

7. The flow meter system according to claim 1, wherein said second flow meter is comprised of a venturi meter, said fourth measurement being differential pressure at an inlet to a midpoint of said venture meter.

8. The flow meter system according to claim 1, wherein said third flow meter is comprised of a water-cut meter, said fifth measurement being dielectric constant.

9. The flow meter system according to claim 1, wherein said fourth flow meter is comprised of a second venturi meter, said sixth measurement being differential pressure along a straight pipe of said downstream flow.

10. The flow meter system according to claim 1, wherein each group of interrelated unknown variables is different, wherein said target unknown variable is selected from an unknown variable of the first, second, third, fourth, fifth and sixth groups of interrelated unknown variables corresponding to the first, second, third, fourth, fifth and sixth measurements, and wherein said iterative process solves for said target unknown variable.

11. The flow meter system according to claim 1, wherein a number of equations of said mathematical model corresponds to a number of interrelated unknown variables of the first, second, third, fourth, fifth and sixth groups of interrelated unknown variables, according to compatibility with said iterative process.

12. The flow meter system according to claim 1, wherein a number of measurements from the first, second, third and fourth flow meters corresponds to said number of interrelated unknown variables of the first, second, third, fourth, fifth and sixth groups of interrelated unknown variables, according to compatibility with said iterative process.

13. The flow meter system according to claim 1, wherein a number of flow meters corresponds to said number of interrelated unknown variables of the first, second, third, fourth, fifth and sixth groups of interrelated unknown variables, according to compatibility with said iterative process.

14. The flow meter system according to claim 1, wherein a type of flow meter of each of the first, second third, and fourth flow meters corresponds to a number of interrelated unknown variables of the first, second, third, fourth, fifth and sixth groups of interrelated unknown variables, according to compatibility with said iterative process.

15. The flow meter system according to claim 1, wherein a sensitivity of flow meter of each of the first, second, third and fourth flow meters corresponds to a number of interrelated unknown variables of the first, second, third, fourth, fifth and sixth groups of interrelated unknown variables, according to compatibility with said iterative process.

16. The flow meter system according to claim 1, wherein said second flow meter is selected for said fourth measurement, said fourth group of interrelated unknown variables and a corresponding fourth equation in said mathematical model, said fourth group of interrelated unknown variables being different from the first, second, and third group of interrelated unknown variables and being compatible with said iterative process to solve for said target unknown variable.

17. The flow meter system according to claim 1, wherein said third flow meter is selected for said fifth measurement, said fifth group of interrelated unknown variables and a corresponding fifth equation in said mathematical model, said fifth group of interrelated unknown variables being different from the first, second, third, and fourth group of interrelated unknown variables and being compatible with said iterative process to solve for said target unknown variable.

18. The flow meter system according to claim 1, wherein said fourth flow meter is selected for said sixth measurement, said sixth group of interrelated unknown variables and a corresponding sixth equation in said mathematical model, said sixth group of interrelated unknown variables being different from the first, second, third, fourth and fifth group of interrelated unknown variables and being compatible with said iterative process to solve for said target unknown variable.

* * * * *